United States Patent
Liu et al.

(10) Patent No.: US 9,946,913 B2
(45) Date of Patent: Apr. 17, 2018

(54) ELECTRONIC DEVICE

(71) Applicant: Quanta Computer Inc., Taoyuan (TW)

(72) Inventors: Yun-Cheng Liu, New Taipei (TW); Wan-Chi Lin, Taichung (TW)

(73) Assignee: QUANTA COMPUTER INC., Taoyuan (TW)

( * ) Notice: Subject to any disclaimer, the term of this patent is extended or adjusted under 35 U.S.C. 154(b) by 350 days.

(21) Appl. No.: 14/807,645

(22) Filed: Jul. 23, 2015

(65) Prior Publication Data
US 2016/0337559 A1   Nov. 17, 2016

(30) Foreign Application Priority Data
May 14, 2015   (TW) .............. 104115420 A (51) Int. Cl.
*H04N 5/225*   (2006.01)
*G06K 9/00*    (2006.01)

(52) U.S. Cl.
CPC .............. *G06K 9/00013* (2013.01)

(58) Field of Classification Search
CPC ............. G06K 9/00013; G06K 9/0002; H04N 5/2252; H04N 5/2251; H04N 5/2253; H01L 23/10; H01H 13/14
USPC .................................... 348/77; 382/124
See application file for complete search history.

(56) References Cited

U.S. PATENT DOCUMENTS

| 7,890,778 B2 * | 2/2011 | Jobs ................... G06F 1/26 345/23 |
| 2014/0171158 A1 | 6/2014 | Setlak et al. |
| 2015/0071510 A1 * | 3/2015 | Kim ................ G06K 9/0002 382/124 |
| 2015/0319294 A1 * | 11/2015 | Sudhir ............ H04M 1/72541 455/411 |

FOREIGN PATENT DOCUMENTS

| TW | M259252 U | 3/2005 |
| TW | 200925841 A | 6/2009 |
| TW | 200947195 A | 11/2009 |
| TW | 201222347 A | 6/2012 |

* cited by examiner

*Primary Examiner* — William C Vaughn, Jr.
*Assistant Examiner* — Naod Belai
(74) *Attorney, Agent, or Firm* — Rabin & Berdo, P.C.

(57) ABSTRACT

An electronic device is disclosed herein and includes a multi-functional power button and a processor, where the multi-functional power button includes a power switch and a fingerprint recognition module. The fingerprint recognition module is combined on the power switch, and the processor is coupled to the multi-functional power button. The fingerprint recognition module is configured to extract a fingerprint feature information. The processor is configured to determine whether the multi-functional power button is pressed or touched to respectively cause the power switch to generate a switching signal or cause the fingerprint recognition module to extract the fingerprint feature information.

8 Claims, 5 Drawing Sheets

ELECTRONIC DEVICE

RELATED APPLICATIONS

This application claims priority to Taiwan Application Serial Number 104115420, filed May 14, 2015, which is herein incorporated by reference.

BACKGROUND

Field of Invention

The present invention relates to electronic device technology. More particularly, the present invention relates to an electronic device for operation recognition.

Description of Related Art

With development of network technology becomes mature, some service (e.g., online payment or other information that involves personal privacy) requires an environment with higher security, and combinations of accounts and passwords are often used for identity certification. For users, although security of personal information is increased, account and password are required to be entered again whenever the identity is under certification so that burdens on the users are also increased. Particularly, if the users setup different combinations of accounts and passwords corresponding to different services, difficulty with use of the combinations of accounts and passwords is further increased. Moreover, once the passwords are cracked, the users need to take risks that personal information leaks and be hacked.

Therefore, one of currently important subjects of research is how to improve convenience of identity certification and security concerns, which also becomes an objective that desires to be improved in related fields.

SUMMARY

In order to improve convenience and security of identity certification, the present disclosure provides an electronic device that includes a multi-functional power button and a processor, where the multi-functional power button includes a power switch and a fingerprint recognition module. The fingerprint recognition module is combined on the power switch. The processor is electrically coupled to the multi-functional power button. The processor is configured to determine whether the multi-functional power button is pressed or touched to respectively cause the power switch to generate a switching signal or cause the fingerprint recognition module to extract the fingerprint feature information.

In one embodiment of the present disclosure, when determining whether the multi-functional power button is pressed or touched, the processor determines whether an identity verification request is received in advance.

In one embodiment of the present disclosure, the electronic device further includes a shell combined with a limit piece to contain the fingerprint recognition module and the power switch, and the shell has an opening. The fingerprint recognition module includes a fingerprint recognition sensor and a circuit board. The fingerprint recognition sensor is exposed on the opening of the shell. The circuit board has a first surface and a second surface that are opposite to each other, where the fingerprint recognition sensor is disposed on the first surface, and the power switch is disposed on the second surface and located between the circuit board and the limit piece.

In one embodiment of the present disclosure, the shell has an extension part that extends from the opening toward the shell inside. The fingerprint recognition module includes a ladder part that is disposed on the first surface and in contact with the extension part.

In one embodiment of the present disclosure, the electronic device further includes a metal electrode that is disposed on the second surface of the circuit board. The power switch is a metal dome switch.

In one embodiment of the present disclosure, the electronic device further includes a storage device that is electrically coupled to the processor. The storage device is configured to store at least one fingerprint recognition datum. The processor compares the at least one fingerprint recognition datum and the fingerprint feature information. When the at least one fingerprint recognition datum and the fingerprint feature information are matched, the processor generates a confirming signal to response the identity verification request.

In one embodiment of the present disclosure, the electronic device further includes a display device that is electrically coupled to the processor, so that the processor executes an operation of power on or off of the display device according to the switching signal.

In one embodiment of the present disclosure, when the display device is power on, the processor determines whether a duration of the switching signal is larger than a predetermined time, when the duration is smaller than the predetermined time, the processor turns off the display device.

In one embodiment of the present disclosure, when the display device is power off, the processor determines whether a duration of the switching signal is larger than a predetermined time, when the duration is smaller than the predetermined time, the processor turns on the display device.

In one embodiment of the present disclosure, when the processor determines whether a duration of the switching signal is larger than a predetermined time, when the duration is larger than the predetermined time, the processor executes a shutdown process.

In sum, the present disclosure is directed to executing identity certification or operation of turning on or off powers, for example, turning on/off device or turning on/off screen, according to whether an identity verification request is received by device (such as request of entering a login information of the user, a request of entering payment certification information or any other identity verification request that requires personal information of the user) and a detected user action to multi-functional power button. The aforementioned multiple functions are implemented in a multi-functional power button. Because fingerprint has high uniqueness, taking fingerprint is taken as a basis of certification not only improves security of personal information, but also simplifies complexity in use to further improve convenience by integrating finger recognition function in a frequently used power button in the present disclosure.

The following is detailed description of the aforementioned contents through embodiments, and provides further explanation of the technical aspects of the present disclosure.

BRIEF DESCRIPTION OF THE DRAWINGS

In order to make the aforementioned contents, and other purposes, features, advantages, and embodiments more clear and understandable, with description made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled", and the term "connected" may be termed as "electrically connected". "Coupled" and "connected" may also be used to indicate that two or more elements cooperate or interact with each other.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1:
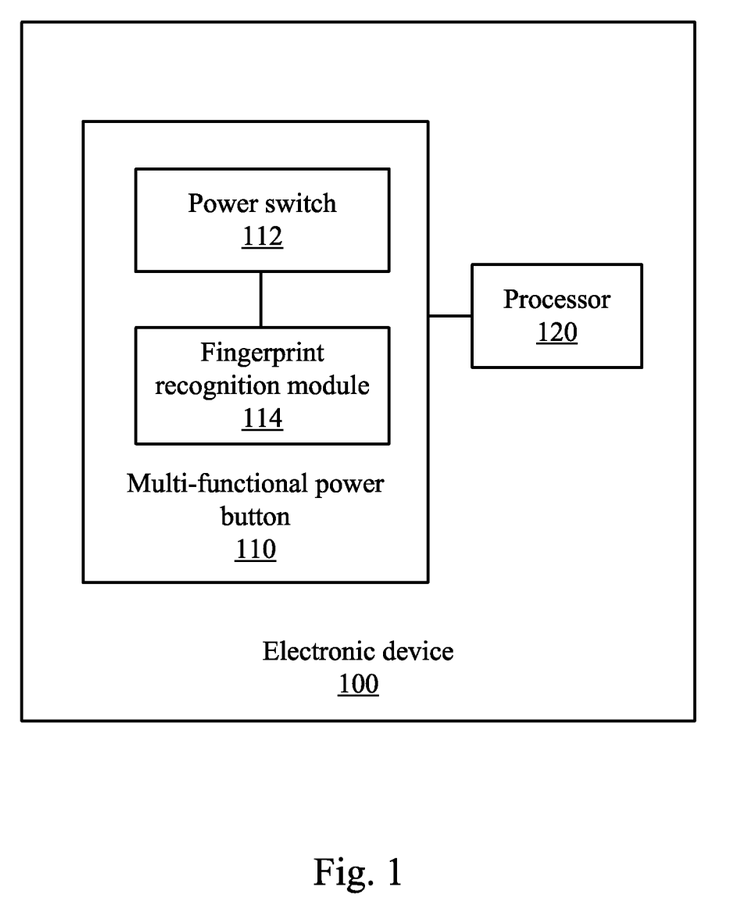
FIG. 1 is a schematic diagram of an electronic device according to an embodiment of the present disclosure.

FIG. 1 is a schematic diagram of an electronic device 100 according to an embodiment of the present disclosure. The electronic device 100 includes a multi-functional power button 110 and a processor 120, where the multi-functional power button 110 includes a power switch 112 and a fingerprint recognition module 114. The fingerprint recognition module 114 is combined on the power switch 112. The processor 120 is electrically coupled to the multi-functional power button 110. In practice, the fingerprint recognition module 114 may utilize an optical sensor, a capacitive sensor, combinations thereof, or any other appropriate fingerprint recognition sensor, and the present disclosure doesn't limit sensors utilized by the fingerprint recognition module 114. For example, the fingerprint feature information is used for user identity certification on the basis of fingerprint with high uniqueness, and substantially increases security and reliability of certification. Moreover, in comparison with the complicated steps of entering information of accounts and passwords, because users only need to put their fingers on the fingerprint recognition module 114 to execute identity certification, convenience is also improved. Specifically, the aforementioned processor 120 can be implemented as software, hardware and/or firmware. For example, if executing speed and accuracy are considered to be the most important, then basically the processor 120 may mainly select hardware and/or firmware for use; if design flexibility is considered to be the most important, then basically the processor 120 may mainly select software for use; alternatively, the processor 120 may simultaneously use software, hardware and firmware to operate in coordination. It should be understood that the above examples have no discrimination between good and bad, and are not used to limit the present disclosure. Those skilled in the art can flexibly select specific means of implementation according to demands. In one embodiment, the processor 120 is a central processing unit (CPU); alternatively, in another embodiment, the processor 120 is a microcontroller unit (MCU).

The processor 120 is configured to cause the power switch 112 to generate a (system) switching signal or a display switching signal to turn on or off related powers (e.g., electronic device itself or a display device of the electronic device) when the multi-functional power button 110 is "pressed" (i.e., the multi-functional power button 110 has a physical downward displacement). Moreover, the processor 120 is also configured to cause the fingerprint recognition module 114 to extract a fingerprint feature information of a user to execute determination of identity certification when the multi-functional power button 110 is "touched" (i.e., without a physical downward displacement).

In a specific embodiment, when the processor 120 determines an identity verification request (for example, a user online shops by the electronic device 100), the processor 120 executes identity certification according to the fingerprint feature information. For example, the identity verification request is a request of entering a login information of the user, a request of entering payment certification information or any other identity verification request that requires personal information of the user, and the identity verification request may be generated by operating system (OS) of the electronic device or received from Internet. The fingerprint feature information differs from different users, and the fingerprint feature information is difficult to be copied in comparison to accounts and passwords that are prone to information leakage. Therefore, executing identity certification according to the fingerprint feature information can improve security.

Figure 2:
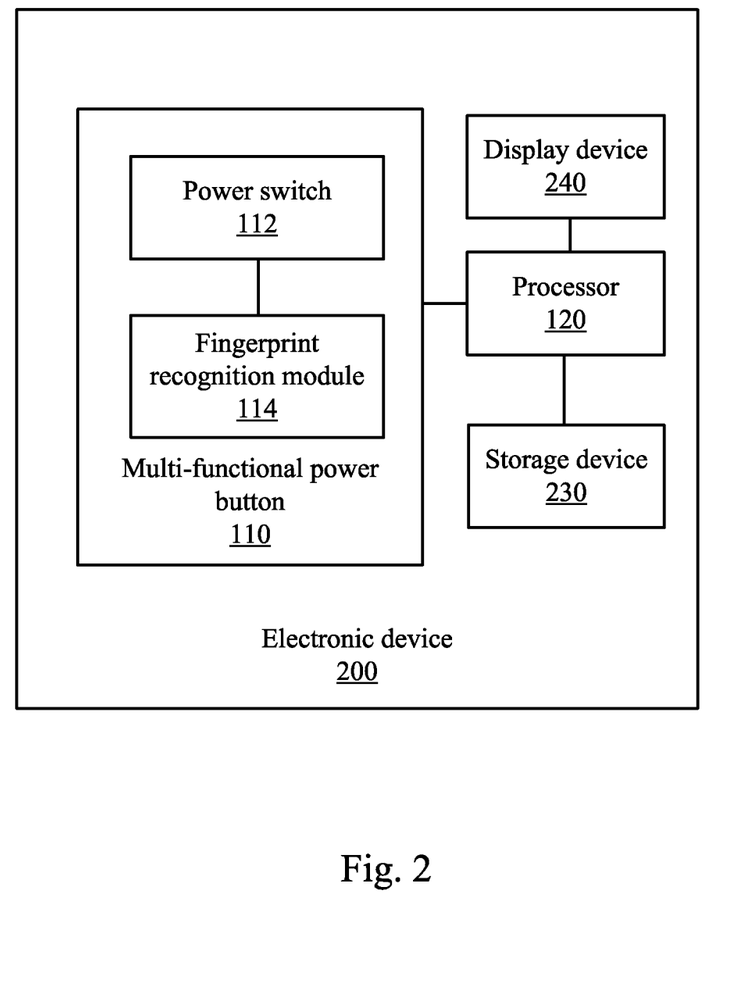
FIG. 2 is a schematic diagram of an electronic device according to an embodiment of the present disclosure.

In order to specifically describe operations of turning on or off related powers by the processor 120 and processes of identity certification, please refer to FIG. 2. FIG. 2 is a schematic diagram of an electronic device 200 according to an embodiment of the present disclosure. The electronic device 200 has substantially the same hardware as the electronic device 100 in FIG. 1 except a storage device 230 and a display device 240, where the storage device 230 and the display device 240 are both electrically coupled to the processor 120. In practice, the storage device 230 can be a read only memory (ROM), a flash memory, a floppy disk, a hard disk, an optical disk, a pen drive, a magnetic tape, a network accessible database, or any other suitable non-transitory computer-readable medium with the same function. The display device 240 can be a plasma display panel, a liquid crystal display (LCD), a thin film transistor liquid crystal display (TFT-LCD), a light emitting diode (LED) display, an organic light emitting diode (OLED) display, or any other display device.

The storage device 230 is configured to store at least one fingerprint recognition datum. In one embodiment, the fingerprint recognition datum can be fingerprint features of one or more authorized users so as to be a comparison target when the processor 120 executes processes of identity certification. In one embodiment, when the processor 120 receives an identity verification request, the processor 120 compares the at least one fingerprint recognition datum and the fingerprint feature information extracted by the fingerprint recognition module 114. When the at least one fingerprint recognition datum and the fingerprint feature information are matched, the processor 120 generates a confirming signal to response the identity verification request and confirm that the user identity is authorized.

When the fingerprint recognition module 114 is pressed so that the power switch generates a switching signal, the processor 120 executes operation of turning on or off power of the display device 240 according to the switching signal. In one embodiment, the processor 120 further determines whether duration of the switching signal is larger than a predetermined time to execute operation of turning on or off related power. In one embodiment, when the duration is smaller than the predetermined time, the processor 120 execute operation of turning on or off power of the display device 240 according to the current status of the display device 240. For example, when the current status of the display device 240 is power on, if the duration is smaller than the predetermined time, the processor 120 turns off the display device 240. For another example, when the current status of the display device 240 is power off, if the duration is smaller than the predetermined time, the processor 120 turns on the display device 240. In one embodiment, when the duration is larger than the predetermined time, no matter the current status of the display device 240 is power off or power on, the processor 120 executes a shutdown process and stops operation of the electronic device. In one embodiment, the predetermined time can be designed according to actual demands. For example, in the present embodiment, the predetermined time is set as 2 seconds. In one embodiment, in a shutdown status, when the fingerprint recognition module 114 is pressed to cause the power switch 112 to generate a switching signal, the processor 120 executes a starting up process, and then executes identity certification according to the fingerprint feature information to login operating system.

Figure 3:
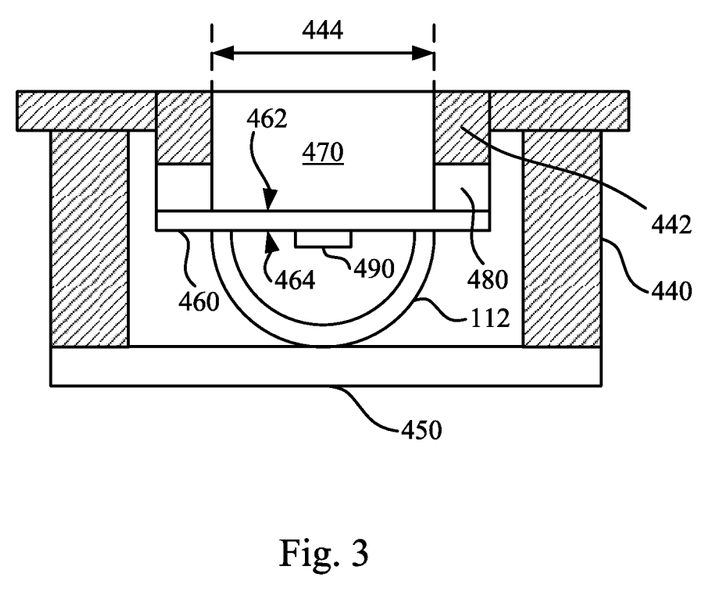
FIG. 3 is a cross-sectional view of a multi-functional power button according to an embodiment of the present disclosure.

In order to describe how the multi-functional power button 110 generates a pressed action (i.e., with a physical displacement path) and a touched action (i.e., without a physical displacement path). FIG. 3 is a cross-sectional view of a multi-functional power button according to an embodiment of the present disclosure. The electronic device includes a shell 440 that is combined with a limit piece 450 for containing the fingerprint recognition module 114 and the power switch 112. The shell 440 has an opening 444 and an extension part 442. The extension part 442 extends from the opening 444 toward the shell 440 inside. The fingerprint recognition module 114 includes a fingerprint recognition sensor 470, a circuit board 460 and a ladder part 480. The fingerprint recognition sensor 470 exposes on the opening 444 of the shell 440 to extract a fingerprint feature information of the user easily when the fingerprint recognition sensor 470 is touched. Therefore, the user only needs to touch the fingerprint recognition sensor 470 to activate the sensor. The circuit board 460 has a first surface 462 and a second surface 464 that are opposite to each other, where the fingerprint recognition sensor 470 is disposed on the first surface 462, and the power switch 112 is disposed on the second surface 464 and located between the circuit board 460 and the limit piece 450. The ladder part 480 is disposed on the first surface 462 and in contact with the extension part 442.

In one embodiment, the fingerprint recognition module further includes a metal electrode 490 that is disposed on the second surface 464 of the circuit board 460. The power switch 112 is coupled with the circuit board 460 on the second surface 464 for hooding the metal electrode 490, and it is electrically isolated from the metal electrode 490 when not pressed. The deformation of the power switch 112 occurs by a pressing action of a user so that the power switch 112 is in contact with the metal electrode 490 and electrically connected to the metal electrode 490 so as to generate a switching signal. In one embodiment, the power switch 112 is elastic. After the pressing action of the user is stopped, the power switch 112 reverts to a configuration before the deformation and is not electrically connected to the metal electrode 490 to stop generating the switching signal.

In one embodiment, the ladder part 480 that is disposed on the first surface 462 of the circuit board 460 is in contact with the extension part 442 of the shell 440 to define a movable upper limiting position, i.e. an upper limit of a movable range, of the fingerprint recognition sensor 470. In one embodiment, one or more ladder parts 480 are disposed on a continuously curved lateral surface of the fingerprint recognition sensor 470 with a cylindrical shape. The limit piece 450 defines a movable lower limiting position, i.e. a lower limit of a movable range, of the fingerprint recognition sensor 470. When the user applies a pressing action on a surface of the fingerprint recognition sensor 470, a distance between the limit piece 450 and the circuit board 460 decreases to cause deformation of the power switch 112. The deformed power switch 112 is in contact with the metal electrode 490 and electrically connected to the metal electrode 490 to generate the switching signal. The aforementioned duration of contact is defined as duration of the switching signal. In other words, if the power switch 112 remains electro-isolated from the metal electrode 490, then the switching signal is not generated. Therefore, the processor 120 doesn't execute operations of turning on or off related powers. In one embodiment, the power switch 112 is implemented as a metal dome switch. With the aforementioned design, the electronic device 100 can determine whether the user want to use the power switch 112 or the fingerprint recognition sensor 470 through the pressing action or the touching action of the user, and then generate a corresponding action.

In one specific embodiment, if there is an attempt to press the multi-functional power button 110, the fingerprint recognition module is certainly touched. Therefore, if the electronic device 100 simultaneously detects a pressing action and a touching action, then the touching action is ignored, that is, only the pressing action that the user wants to apply is determined at this moment. Accordingly, the upper limiting position and the lower limiting position in the previous paragraph are used for generation of a physical displacement so as to determine whether the user wants to press the power switch 112, and not associated with functions of the fingerprint recognition module (fingerprint recognition module only requires a touching action).

Figure 4:
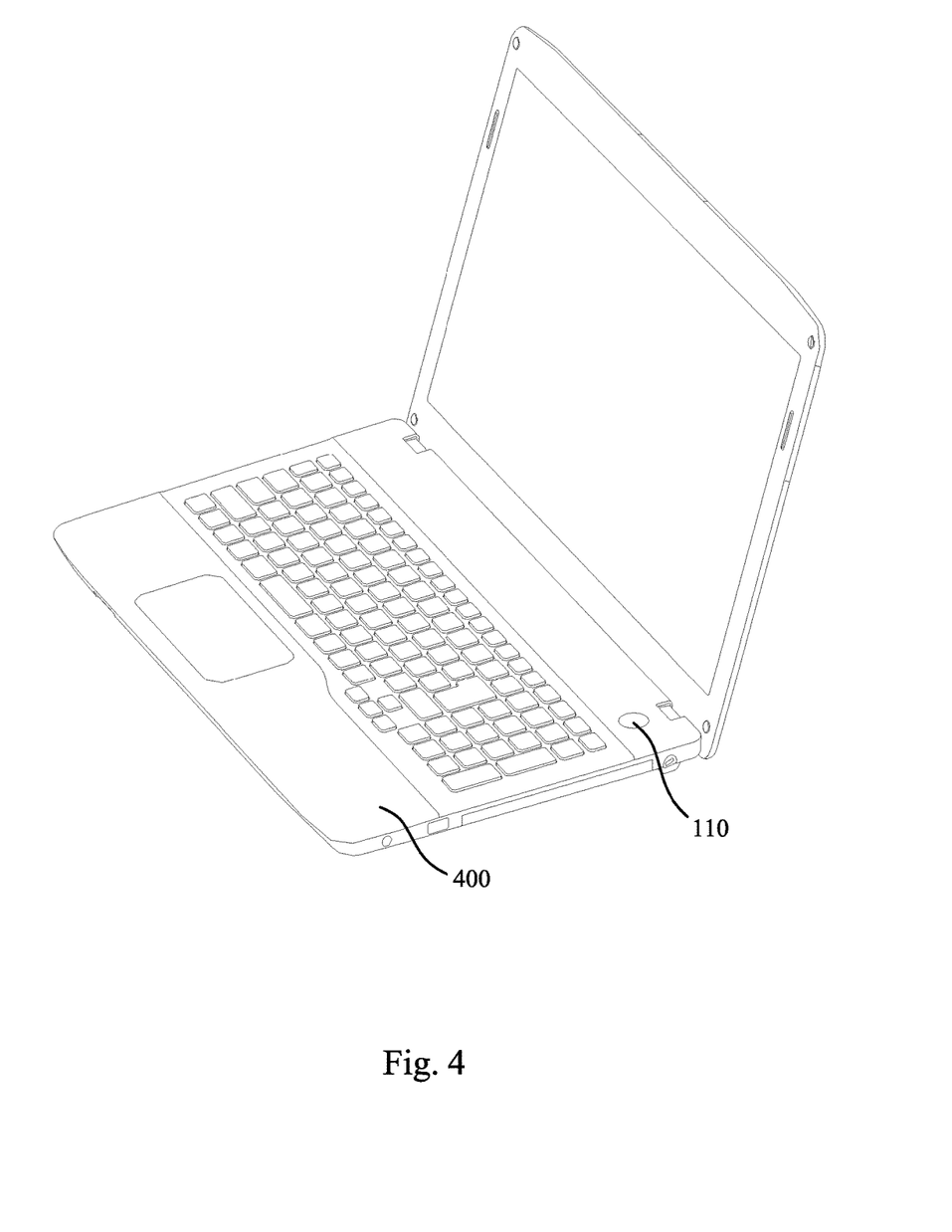
FIG. 4 is a schematic diagram of a multi-functional power button of an electronic device according to an embodiment of the present disclosure.

The aforementioned multi-functional power button 110 can be implemented in a mobile electronic device, such as a mobile phone, a smart phone, a personal digital assistant (PDA), a personal assistant mobile phone, a notebook, a tablet PC, a handheld email device, a handheld navigation device, a handheld game device, a handheld multimedia player, or any other mobile communication and/or computing device. For example, the multi-functional power button 110 is implemented on a notebook 400, as shown in FIG. 4.

Figure 5:
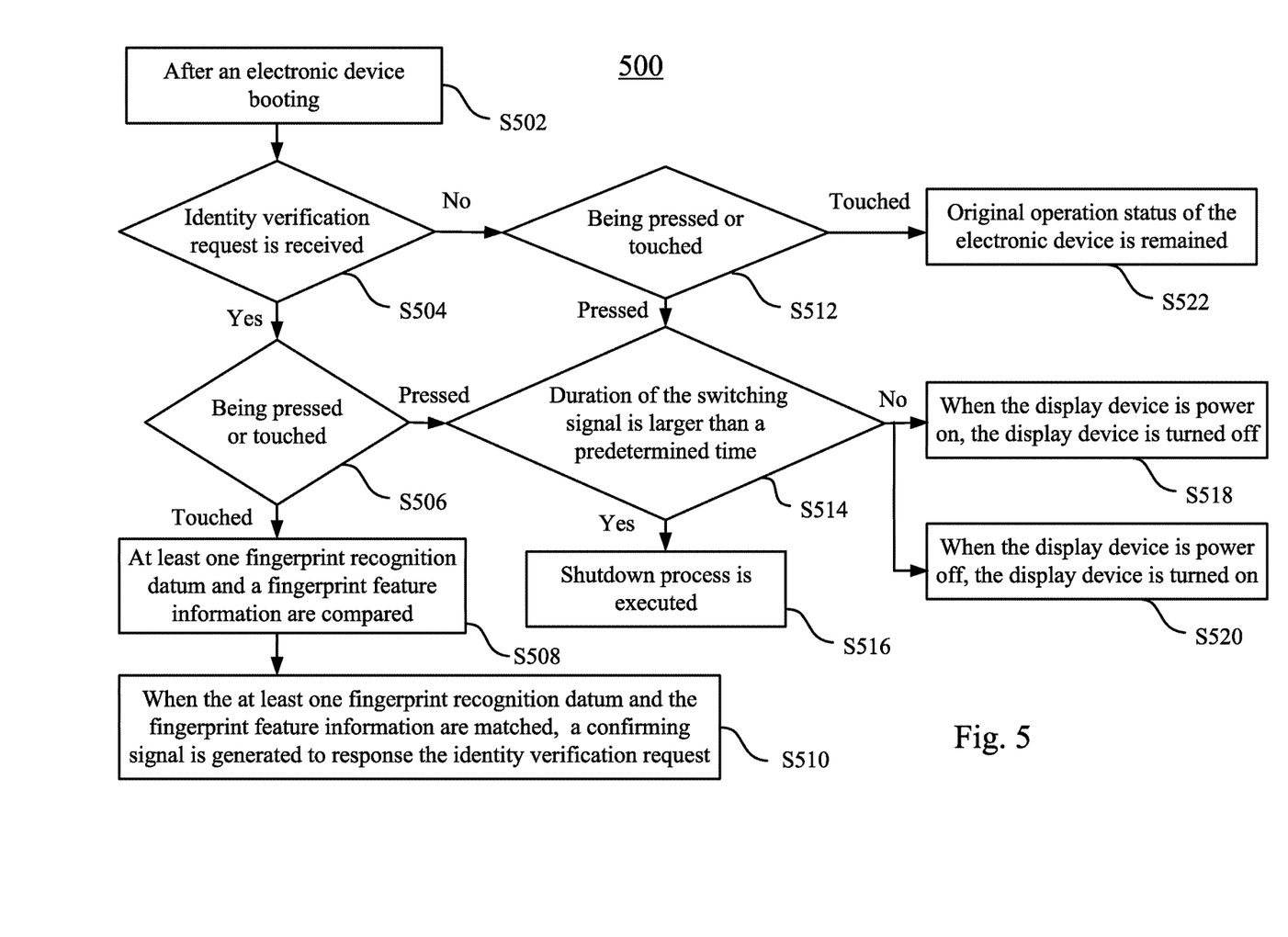
FIG. 5 is a flow chart of an operation recognition method for an electronic device according to an embodiment of the present disclosure.

FIG. 5 is a flow chart of an operation recognition method 500 for an electronic device according to another embodiment of the present disclosure. The operation recognizing method 500 for an electronic device includes a plurality of steps S502-S522 and can be applied in the electronic devices 100-200 in FIGS. 1-2. However, those skilled in the art should understand that the mentioned steps in the present embodiment are in an adjustable execution sequence according to the actual demands except for the steps in a specially described sequence, and even the steps or parts of the steps can be executed simultaneously.

First, in step S502, after an electronic device booting, whether an identity verification request is received is determined in step S504. For example, the identity verification request is a request of entering a login information of the user, a request of entering payment certification information or any other identity verification request that requires personal information of the user, and the identity verification request may be generated by operating system (OS) of the electronic device or received from Internet. If the identity verification request is received, whether a multi-functional power button 110 is pressed or touched is determined in step S506. If being pressed is determined, then step S514 is executed (described in detail later). If being touched is determined, then at least one fingerprint recognition datum and a fingerprint feature information are compared in step S508. In step S510, when the at least one fingerprint recognition datum and the fingerprint feature information are matched, a confirming signal is generated to response the identity verification request. In step S506, if the multi-functional power button 110 is determined being neither pressed nor touched (not shown), then an original operation status of the electronic device is remained (i.e. the electronic device 100 doesn't execute any action). In contrast, if the identity verification request is not received in step S504, whether the multi-functional power button 110 is pressed or touched is determined in step S512. If being touched is determined, then the original operation status of the electronic device is remained because there is no identity verification request at this moment in step S522. Similarly, if the multi-functional power button 110 is determined being neither pressed nor touched (not shown) in step S512, then the original operation status of the electronic device is remained (i.e. the electronic device 100 doesn't execute any action).

In one embodiment, in step S506 or S512, if the multi-functional power button 110 is determined being pressed so that the power switch generates a switching signal, then in step S514, whether duration of the switching signal is larger than a predetermined time is determined. If the duration is larger than the predetermined time, then in step S516, a shutdown process is executed to stop operation of the electronic device. In contrast, if the duration is smaller than the predetermined time, then operation of turning on or off a display device is executed according to a current status of the display device. In step S518, when the display device is power on and the duration is smaller than the predetermined time, the display device is turned off. Alternatively, in step S520, when the display device is power off and the duration is smaller than the predetermined time, the display device is turned on. In one embodiment, the predetermined time can be design according to actual demands. For example, in the present embodiment, the predetermined time is set as 2 seconds.

In conclusion, the present disclosure can execute identity certification or operation of turning on or off powers, for example, turning on/off device or turning on/off screen, according to whether an identity verification request is received by device (such as request of entering a login information of the user, a request of entering payment certification information or any other identity verification request that requires personal information of the user) and a detected user action to multi-functional power button through the above-mentioned embodiments. The aforementioned multiple functions are implemented in a multi-functional power button. Because fingerprint has high uniqueness, taking fingerprint as a basis of certification not only improves security of personal information, but also simplifies complexity in use to further improve convenience by integrating finger recognition function in a frequently used power button in the present disclosure.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic device, comprising:
  a multi-functional power button, comprising:
    a power switch; and
    a fingerprint recognition module, combined on the power switch, the fingerprint recognition module is configured to extract a fingerprint feature information; and
  a processor, electrically coupled to the multi-functional power button and configured to determine whether the multi-functional power button is pressed or touched to respectively cause the power switch to generate a switching signal or cause the fingerprint recognition module to extract the fingerprint feature information,
  wherein the electronic device further comprises a shell combined with a limit piece to contain the multi-functional power button, the shell having an opening and an extension part, and the extension part extending from the opening toward the shell inside,
  wherein the fingerprint recognition module comprises:
    a fingerprint recognition sensor exposed on the opening of the shell;
    a circuit board having a first surface and a second surface that are opposite to each other, wherein the fingerprint recognition sensor is disposed on the first surface, and the power switch is disposed on the second surface and located between the circuit board and the limit piece, wherein the power switch is in contact with the limit piece;

a metal electrode disposed on the second surface of the circuit board, wherein the power switch hoods the metal electrode and is electrically isolated from the metal electrode; and a ladder part disposed on the first surface of the circuit board, and in contact with the extension part to define an upper limit of a movable range, wherein the ladder part is separable with the extension part, and when the fingerprint recognition sensor is moved toward the limit piece, the power switch is deformed to contact with the metal electrode to generate the switching signal.

2. The electronic device of claim 1, wherein when determining whether the multi-functional power button is pressed or touched, the processor determines whether an identity verification request is received in advance.

3. The electronic device of claim 1, wherein the power switch is a metal dome switch.

4. The electronic device of claim 2, further comprising:
a storage device, electrically coupled to the processor and configured to store at least one fingerprint recognition datum, wherein the processor compares the at least one fingerprint recognition datum and the fingerprint feature information;

when the at least one fingerprint recognition datum and the fingerprint feature information are matched, the processor generates a confirming signal to response the identity verification request.

5. The electronic device of claim 2, further comprising:
a display device, electrically coupled to the processor, so that the processor executes an operation of power on or off of the display device according to the switching signal.

6. The electronic device of claim 5, wherein when the display device is power on, the processor determines whether a duration of the switching signal is larger than a predetermined time;

when the duration is smaller than the predetermined time, the processor turns off the display device.

7. The electronic device of claim 5, wherein when the display device is power off, the processor determines whether a duration of the switching signal is larger than a predetermined time;

when the duration is smaller than the predetermined time, the processor turns on the display device.

8. The electronic device of claim 5, wherein the processor determines whether a duration of the switching signal is larger than a predetermined time;

when the duration is larger than the predetermined time, the processor executes a shutdown process.

* * * * *